Jan. 25, 1955 W. C. FERGUSON ET AL 2,700,631
METHOD OF PROVIDING ARTICLES WITH A PLASTIC COATING
Filed July 5, 1951
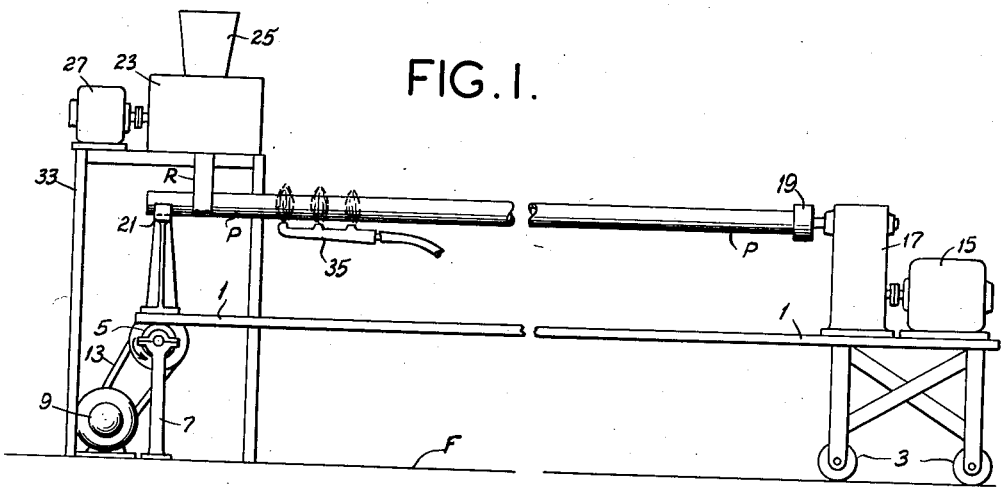
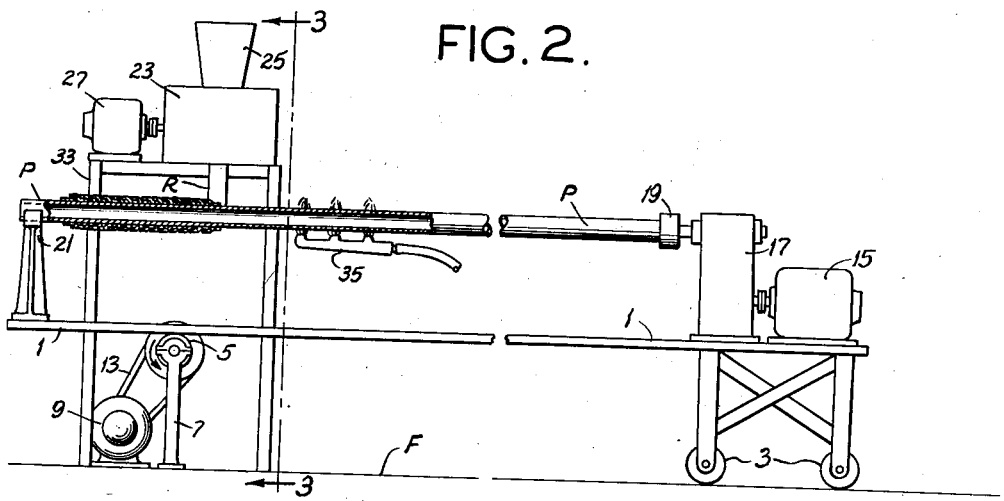
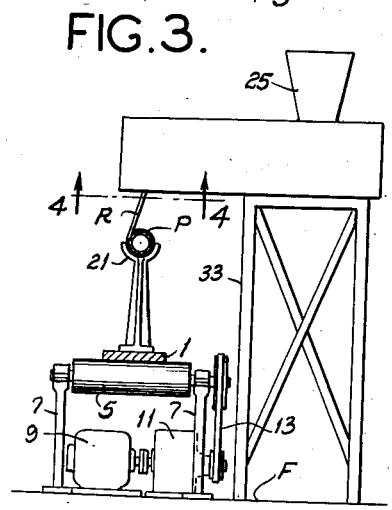
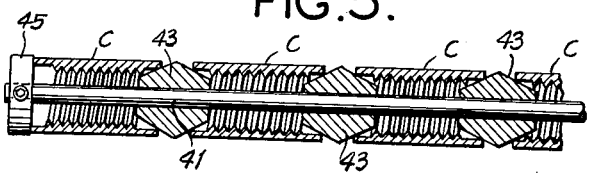
William C. Ferguson,
Paul S. Sussenbach,
Inventors.
Koenig and Pope,
Attorneys.

United States Patent Office 2,700,631
Patented Jan. 25, 1955

2,700,631
METHOD OF PROVIDING ARTICLES WITH A PLASTIC COATING

William C. Ferguson, St. Louis, and Paul S. Sussenbach, Brentwood, Mo., assignors to The Presstite Engineering Company, St. Louis, Mo., a corporation of Missouri Application July 5, 1951, Serial No. 235,334

6 Claims. (Cl. 154—102)

This invention relates to methods of providing articles with a plastic coating, and more particularly to methods of providing such articles as lengths of pipe and pipe couplings with an exterior coating of thermoplastic material.

The principal object of the invention is the provision of an improved method for providing conventional pipe, and pipe couplings such as used to couple together lengths of pipe, with a permanent exterior coating of corrosion-resistant thermoplastic material to protect the pipe and couplings from corrosion when buried in the ground. It will be understood that the invention is applicable to provision of plastic coatings on articles other than pipe and pipe couplings, whether made of metal or other material, even wood, for example.

It has heretofore been known to coat a length of pipe with a thermoplastic coating material, such as polyethylene, for example, by extruding the coating material, heated to be of a consistency suitable for extrusion around the pipe, as the pipe is caused to pass through an extrusion die of the type referred to in the art as a crosshead die. The die has an opening slightly larger than the outside diameter of the pipe, and, as the pipe passes through this opening, the plastic material is extruded around the pipe to form a coating thereon having a thickness determined principally by the difference in the diameter of the opening and the outside diameter of the pipe, and by the amount of stretch of the plastic in the direction of the length of the pipe. This method has such disadvantages as tending toward non-uniformity of thickness of the coating, with consequent danger of having too thin a coverage in one or more areas, and weakness of the coating in transverse direction, i. e., in peripheral direction around the pipe, because of its being stretched in the direction of length of the pipe. The apparatus required for carrying out this method is such as to make it inconvenient to change over for extruding coatings of different thickness, or for coating pipes of different outside diameters. The method is not suitable for coating pipe couplings, these being too short to be coated by this method, and is not suitable for coating any articles other than pipe or at most elongate articles having a uniform cross section throughout their length.

This invention provides a method of providing pipe with a plastic coating without any too-thin areas and without the weakening of the coating in a transverse or peripheral direction, capable of being carried out with various apparatus adapted for ready change-over to provide coatings of different thickness and/or to provide coatings on pipes of different outside diameter. The method of this invention is also readily adapted for providing coatings on pipe couplings, and in fact on a great many articles, whether such articles are of uniform cross section throughout their length or not. For example, it may be used to provide a coating of substantially uniform thickness on a tapering pipe, which cannot be accomplished by the above described conventional crosshead die extrusion method.

In general, the method of this invention comprises the extrusion of a ribbon of a plastic material, and the wrapping of the article to be provided with a coating with the extruded ribbon as it is extruded. Other features will be in part apparent and in part pointed out hereinafter.

The invention accordingly comprises the steps and sequence of steps, and features of manipulation, which will be exemplified in the methods hereinafter described, and the scope of which will be indicated in the following claims.

In the accompanying drawings, in which one of various possible embodiments of the invention is illustrated, Fig. 1 is a view in elevation illustrating the method of this invention being carried out with an apparatus suitable for the purpose, the apparatus being to some extent only diagrammatically illustrated, the view showing parts in position at the start of wrapping of a pipe;

Fig. 2 is a view similar to Fig. 1 but showing parts in position occupied after wrapping of the pipe has been partially completed;

Fig. 3 is a vertical transverse section taken substantially on line 3—3 of Fig. 2;

Fig. 4 is a fragmentary view taken substantially on line 4—4 of Fig. 3; and,

Fig. 5 is a longitudinal section of a string of pipe couplings showing one way in which they can be put together for coating in accordance with this invention.

Similar reference characters indicate corresponding parts throughout the several views of the drawings.

Referring to the drawings, which illustrate generally diagrammatically one type of apparatus with which the invention may be readily carried out, there is shown at 1 an elongate support having wheels 3 at one end. At its other end the support rests on a horizontal roller 5 mounted at its ends in bearing pedestals 7 fixed to the floor F. The roller 5 is adapted to be driven at relatively low speed by a motor 9 driving the roller through a speed reducer 11 and a chain and sprocket drive 13. By rotating the roller counterclockwise as viewed in Figs. 1 and 2, the entire support 1 may be moved toward the left.

On the support at its wheeled end is a motor 15 coupled to the input shaft of a speed reducer 17. On the output shaft of the speed reducer is a coupling 19 for attachment of one end of a pipe P which is to be coated. At the other end of the support is a bearing pedestal 21 for rotatably supporting the other end of the pipe.

At 23 is shown an extruder for extruding a thin flat ribbon of plastic material. This extruder is of a conventional and well known type having a hopper 25 which is loaded with pellets of a thermoplastic material to be used (and a pigment, if desired) and having means for heating the material to a temperature at which it is of a consistency suitable for extrusion, and having a screw or worm for forcing the material through an extrusion die. A motor for driving the screw of the extruder is shown at 27. The extruder, in general, is a conventional commercially available item, well known in the art, but is especially equipped with a die 29 having an elongate narrow slot 31 as the die opening for extruding a ribbon of the desired width and thickness. It will be understood that in the operation of the extruder, a thermoplastic material, heated in the apparatus to extrudable consistency, is forced through the die opening 31 in the form of a ribbon having a width corresponding to the length of the slot, and a thickness corresponding to the width of the slot.

The extruder is mounted on a table 33 at one side of the roller 5 to overhang the support 1, with the die opening 31 above and aligned with the pipe and directed downward, preferably fairly close to the pipe.

In accordance with the method of this invention, the pipe is first cleaned, and then one of its ends is secured by the coupling 19 to be driven by the motor 15, and its other end is journalled in the bearing 21. The pipe is heated by a gas burner indicated at 35 to a temperature sufficiently high to insure that the plastic will adhere to the pipe. For example, in the case of polyethylene, the pipe should be heated preferably to a temperature from 500° F. to 550° F., the temperature of the polyethylene as it issues from the extruder being from about 400° F. to 450° F. The plastic material is extruded in the form of a thin flat ribbon R through the die opening 31 of the extruder. Meanwhile, the pipe is rotating, being driven by the motor 15 through the speed reducer 17. The initial end of the ribbon issuing from the extruder is stuck to the pipe (the ribbon being tacky enough for this) and then the pipe is moved axially past the extruder by starting the motor 9 driving the roller 5.

As shown in Figs. 1 and 2, the pipe is moved to the left. The simultaneous rotation and linear movement of the pipe results in the wrapping of the ribbon helically around the pipe as the ribbon is extruded. Preferably, the speed of rotation of the pipe is so correlated to the rate of extrusion that the tangential speed of the periphery of the pipe is somewhat greater than the rate of extrusion i. e., the speed at which the ribbon issues from the extruder, with the result that the ribbon wraps around the pipe under some tension. This insures a good, tight wrap.

It will be understood that the ribbon as wrapped around the pipe is somewhat soft, since it is not only hot as it issues from the extruder, but is kept hot due to the fact that the pipe has been heated. When the pipe and the ribbon cool, the ribbon hardens in place on the pipe, and forms a hard permanent corrosion-resistant coating thereon.

It will be understood that the thickness of the coating on the pipe depends upon the relationship of the speed of rotation of the pipe and the speed at which the pipe is moved axially. If the speed at which the pipe is moved axially is very slow in relation to the speed of rotation of the pipe, the thickness of the wrapping will be considerably greater than if the pipe had been moved axially rapidly in relation to its speed of rotation. Thus, by varying the relationship of the axial speed of the pipe and its speed of rotation, the thickness of the coating can be readily varied. It will of course be understood that the axial speed of the pipe in relation to the speed of rotation of the pipe will in no case be such that the pitch of the helical wrapping will be greater than the width of the extruded ribbon, to avoid having any uncoated portions of the pipe. That is, the ribbon is always wrapped around the pipe with overlapping convolutions.

In an actual practical carrying out of the invention, as related to the application of a coating to a black iron gas pipe having an outside diameter of about one and one-half inch, we extrude a polyethylene ribbon two inches wide, and about twenty mils thick. The linear speed of travel of the pipe in relation to its speed of rotation is such as to obtain a wrapping two layers thick, with each layer stretched down to about eight to ten mils thick. This means that the total thickness of the coating on the pipe is about sixteen to twenty mils, being somewhat greater at the overlap of the spiral convolutions.

It will be seen that the only stretching of the ribbon which occurs takes place in the direction of the length of the ribbon, which is helically as regards the pipe, not longitudinally of the pipe as in the above-mentioned prior cross-head die extrusion coating method. This preserves the strength of the coating in peripheral direction or as regards the pipe. Thus, upon expansion of the pipe such as occurs upon temperature rise, there is little likelihood of the coating rupturing.

It will be understood that the above-described apparatus is only exemplary of various apparatus that might be used to carry out the method. It will also be understood that polyethylene is only exemplary of various suitable thermoplastic materials that may be used. Any thermoplastic material capable of being extruded and suitable for protecting against corrosion is suitable. Examples of such are ethyl cellulose, cellulose acetate, cellulose acetate butyrate, polystyrene, and vinyl chlorides. It will be understood that the extrusion temperature and the temperature to which the pipe should be heated will vary for different plastics and for different grades of the same plastic.

It will be readily seen that there is no necessity for the article being coated to be of uniform cross section throughout its length. The method is applicable even to the provision of coatings upon irregularly shaped objects. For example, it will be readily seen that the method may be employed to provide a coating of uniform thickness upon a pipe which tapers from one end to the other, or which tapers from a central point down to its ends. Thus, for example the method may be employed to provide a plastic coating on a transition piece.

The invention is also applicable to providing plastic coatings upon pipe couplings such as would be used to couple lengths of pipe coated as above described. For this purpose, a string of pipe couplings C may be made as illustrated in Fig. 5. As shown therein, a number of pipe couplings C are strung on a rod 41 with taper-ended fittings 43 interposed between adjacent couplings. Collars 45 may be secured on the rod at the ends of a string to hold the couplings on the rod. Then the whole string of couplings may be wrapped in the same manner as above described and in conjunction with the wrapping of the pipe P, and a knife used to cut the coating between the adjacent couplings.

In view of the above, it will be seen that the several objects of the invention are achieved and other advantageous results attained.

As many changes could be made in the above methods without departing from the scope of the invention, it is intended that all matter contained in the above description or shown in the accompanying drawing shall be interpreted as illustrative and not in a limiting sense.

We claim:

1. The method of providing an elongate article with a protective coating of a thermoplastic material, comprising extruding a thin flat ribbon of the thermoplastic material heated to a temperature at which it is of extrudable consistency, and wrapping the ribbon helically around the article with overlapping convolutions as the ribbon is extruded and before it cools by sticking the ribbon to the article and effecting simultaneous relative rotation of the ribbon and the article and relative linear movement of the ribbon and the article in the direction of the length of the article.

2. The method of providing an elongate article with a protective coating of a thermoplastic material, comprising extruding at a fixed point a thin flat ribbon of the thermoplastic material heated to a temperature at which it is of extrudable consistency, and wrapping the ribbon helically around the article with overlapping convolutions as the ribbon is extruded and before it cools by sticking the ribbon to the article and simultaneously effecting rotation of the article about a longitudinal axis and linear movement of the article in the direction of its length past said fixed point, the speed of rotation of the article being such that its tangential speed is higher than the rate of extrusion thereby to effect wrapping of the ribbon under tension.

3. The method of providing a metal pipe with a protective coating of a thermoplastic material, comprising heating the pipe, extruding a thin flat ribbon of the thermoplastic material heated to a temperature at which it is of extrudable consistency, and wrapping the ribbon helically around the hot pipe with overlapping convolutions as the ribbon is extruded and before it cools by sticking the ribbon to the pipe and effecting simultaneous relative rotation of the ribbon and the pipe and relative linear movement of the ribbon and the pipe in the direction of the length of the pipe.

4. The method of providing a metal pipe with a protective coating of a thermoplastic material, comprising heating the pipe, extruding at a fixed point a thin flat ribbon of the thermoplastic material heated to a temperature at which it is of extrudable consistency, and wrapping the ribbon helically around the hot pipe with overlapping convolutions as the ribbon is extruded and before cooling by sticking the ribbon to the pipe and simultaneously effecting rotation of the pipe about its longitudinal axis and linear movement of the pipe in the direction of its length past that fixed point, the speed of rotation of the pipe being such that its tangential speed is higher than the rate of extrusion thereby to effect wrapping of the ribbon under tension.

5. The method of providing pipe couplings with a protective coating of a thermoplastic material, comprising assembling a string of pipe couplings and heating them, extruding a thin flat ribbon of the thermoplastic material heated to a temperature at which it is of extrudable consistency, and wrapping the ribbon helically around the hot string of pipe couplings with overlapping convolutions as the ribbon is extruded and before it cools by sticking the ribbon to the string and effecting simultaneous relative rotation of the ribbon and the string and relative linear movement of the ribbon and the string in the direction of the length of the string.

6. The method of providing pipe couplings with a protective coating of a thermoplastic material, comprising assembling a string of pipe couplings and heating them, extruding at a fixed point a thin flat ribbon of the thermoplastic material heated to a temperature at which it is of extrudable consistency at a fixed point, and wrapping the ribbon helically around the hot string as the ribbon is extruded with overlapping convolutions and before cooling by sticking the ribbon to the string and simultaneously effecting rotation of the string about its longitudinal axis and linear movement of the string in the direction of its length past said fixed point, the speed of rotation of the string being such that its tangential speed is higher than the rate of extrusion thereby to effect wrapping of the ribbon under tension.

References Cited in the file of this patent

UNITED STATES PATENTS

| Number | Name | Date |
|---|---|---|
| 1,997,908 | Lord | Apr. 16, 1935 |
| 2,048,360 | Spanel et al. | July 21, 1936 |
| 2,175,125 | Mack et al. | Oct. 3, 1939 |
| 2,187,165 | Lord | Jan. 16, 1940 |
| 2,204,383 | Safford | June 11, 1940 |
| 2,250,967 | Riddle | July 29, 1941 |
| 2,296,781 | Farny | Sept. 22, 1942 |
| 2,339,121 | Cleef | Jan. 11, 1944 |
| 2,371,224 | Cumfer | Mar. 13, 1945 |
| 2,439,084 | Graves | Apr. 6, 1948 |
| 2,502,638 | Becht | Apr. 4, 1950 |
| 2,525,070 | Greenwald et al. | Oct. 10, 1950 |